United States Patent
Yang et al.

(10) Patent No.: US 10,326,316 B2
(45) Date of Patent: Jun. 18, 2019

(54) WIRELESS CHARGING SYSTEM WITH INDUCTANCE IMAGING

(71) Applicant: Apple Inc., Cupertino, CA (US)

(72) Inventors: Heng Yang, Marietta, GA (US);
Weihong Qiu, San Ramon, CA (US);
Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 15/804,596

(22) Filed: Nov. 6, 2017

(65) Prior Publication Data
US 2018/0233954 A1    Aug. 16, 2018

Related U.S. Application Data

(60) Provisional application No. 62/457,739, filed on Feb. 10, 2017.

(51) Int. Cl.
| | |
|---|---|
| *H02J 50/12* | (2016.01) |
| *H02J 50/40* | (2016.01) |
| *H02J 50/80* | (2016.01) |
| *H02J 50/90* | (2016.01) |

(Continued)

(52) U.S. Cl.
CPC .............. *H02J 50/12* (2016.02); *H02J 7/025* (2013.01); *H02J 50/40* (2016.02); *H02J 50/90* (2016.02); *H04B 5/0087* (2013.01); *H02J 50/80* (2016.02)

(58) Field of Classification Search
CPC ............ H02J 5/005; H02J 7/025; H02J 17/00; H02N 2/008; H04B 5/0025–0093; B60L 5/005; B60L 11/182; B60L 11/1829; B60L 11/1831; Y02T 90/122; H01F 27/006; H01F 27/02; H01F 38/14;
(Continued)

(56) References Cited

U.S. PATENT DOCUMENTS

| | | |
|---|---|---|
| 9,024,576 B2 | 5/2015 | Maenpaa |
| 9,209,627 B2 | 12/2015 | Baarman et al. |
| 2009/0001941 A1 | 1/2009 | Hsu et al. |

(Continued)

FOREIGN PATENT DOCUMENTS

CN           204659475 U       9/2015

*Primary Examiner* — Rexford N Barnie
*Assistant Examiner* — Thai H Tran
(74) *Attorney, Agent, or Firm* — Treyz Law Group, P.C.; G. Victor Treyz; Joseph F. Guihan (57) ABSTRACT

A wireless power transmission system has a wireless power receiving device that is located on a charging surface. The wireless power transmitting device has an array of wireless power transmitting coils that overlap the charging surface. The wireless power transmitting device uses inductance measurement circuitry that is coupled to the coil array to measure coil inductances for the wireless power transmitting coils. The wireless power receiving device may contain a communications integrated circuit, display circuitry, or other sensitive components. The location and orientation of the wireless receiving device on the charging surface can be determined by analyzing the coil inductances. This information and information on the location of the sensitive component within the wireless power receiving device can be used to select a wireless power transmitting coil to transmit wireless power signals to the wireless power receiving device without exposing the sensitive component to excessive wireless power signals.

19 Claims, 7 Drawing Sheets

(51) Int. Cl.
*H02J 7/02* (2016.01)
*H04B 5/00* (2006.01)

(58) Field of Classification Search
CPC .. H01F 2038/143–146; H01R 13/6633; A61B 1/00029; A61N 1/3787
USPC .......................................... 307/104; 320/108
See application file for complete search history.

(56) References Cited

U.S. PATENT DOCUMENTS

| | | |
|---|---|---|
| 2011/0115303 A1 | 5/2011 | Baarman et al. |
| 2012/0007437 A1* | 1/2012 | Fells ........................ H01F 38/14 307/104 |
| 2013/0119926 A1 | 5/2013 | Lin |
| 2015/0321567 A1 | 11/2015 | Czainski |
| 2015/0355359 A1* | 12/2015 | Miyashita ............... H02J 7/025 324/207.16 |
| 2016/0322853 A1 | 11/2016 | Porat et al. |

* cited by examiner

WIRELESS CHARGING SYSTEM WITH INDUCTANCE IMAGING

This patent application claims priority to provisional patent application No. 62/457,739 filed on Feb. 10, 2017, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to a portable electronic device. The portable electronic device receives the wirelessly transmitted power and uses this power to charge an internal battery and to power components in the portable electronic device.

It can be challenging to regulate the flow of wireless power in a wireless charging system. For example, in a wireless charging system having adjustable operating settings, it can be difficult to determine which settings to use to effectively transmit wireless power to an electronic device.

SUMMARY

A wireless power transmitting device has an array of wireless power transmitting coils that overlap a charging surface. The charging surface is configured to receive a wireless power receiving device. The wireless power receiving device has a wireless power receiving coil that receives wireless power signals transmitted by the wireless power transmitting device. The wireless power receiving device may also contain a communications integrated circuit, display circuitry, or other component that is sensitive to radio-frequency interference, a metal component that can become heated when exposed to wireless power signals, or other sensitive component. The wireless power transmitting device can select a given one of the array of wireless power transmitting coils to transmit the wireless power signals to the wireless power receiving device without exposing a sensitive component in the wireless power receiving device to excessive wireless power signals.

The wireless power transmitting device uses inductance measurement circuitry that is coupled to the coil array to measure coil inductances for the wireless power transmitting coils. The location and orientation of the wireless receiving device on the charging surface can be determined by analyzing the coil inductances. Information on the location and orientation of the wireless receiving device on the charging surface and information on the location of the sensitive component within the wireless power receiving device can be used to select the given wireless power transmitting coil to transmit wireless power signals to the wireless power receiving device without exposing the sensitive component to excessive wireless power signals.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current drive signals to one or more wireless power transmitting coils in an array of coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
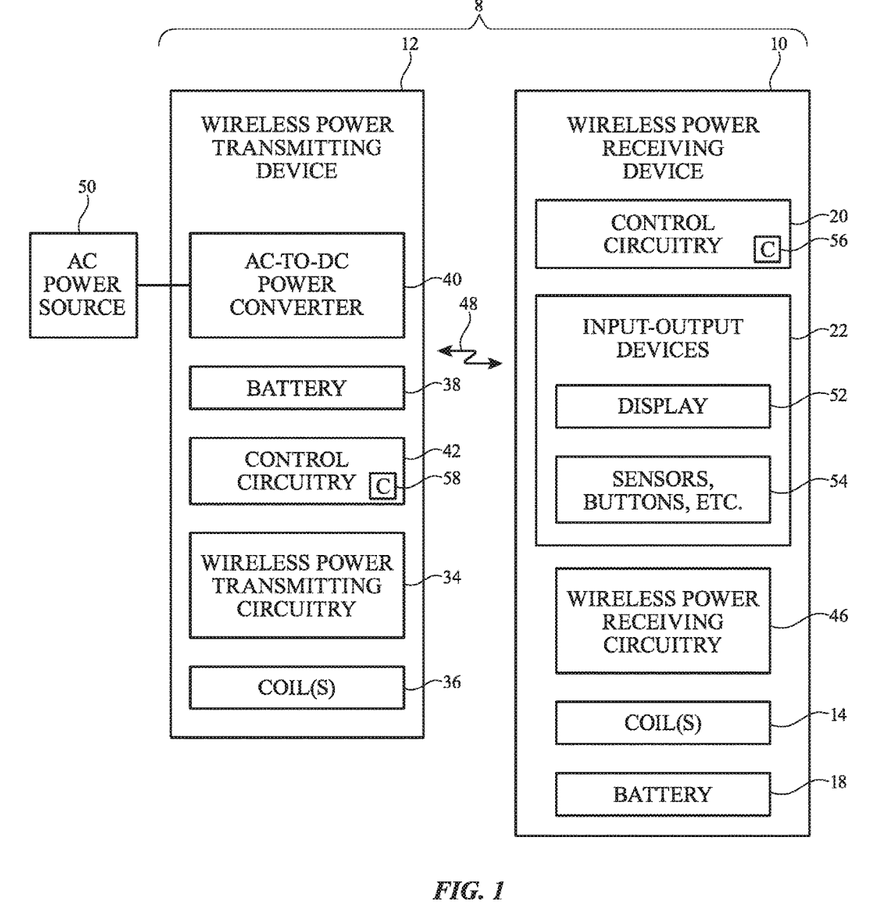
FIG. 1 is a schematic diagram of an illustrative wireless charging system in accordance with embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations are sometimes be described herein as examples.

During operation of system 8, a user places one or more devices 10 on the charging surface of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as alternating-current-to-direct current (AC-DC) power converter 40 can convert power from a mains power source or other alternating-current (AC) power source into direct-current (DC) power that is used to power control circuitry 42 and other circuitry in device 12. During operation, control circuitry 42 uses wireless power transmitting circuitry 34 and one or more coil(s) 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (inverter circuitry) that supplies AC signals (drive signals) to one or more of coils 36 during wireless power transfer operations. One or more coils 36 may be used at a time for wireless power transfer. For example, a single coil 36 may supply power to a single receiving device that overlaps that coil, two coils 36 (e.g., adjacent coils) may supply power to a single device overlapping those two coils or to a pair of devices overlapping those coils, three or more coils may be driven to supply power to a single overlapping receiving device or to multiple overlapping receiving devices, two or more coils or three or more coils that are not adjacent to each other may be driven simultaneously to supply power to two or more or three or more devices at different respective locations on the coil array, etc.

The inverter circuitry that supplies the drive signals to coils 36 may include a single pair of transistors or other inverter circuit coupled to multiple coils 36 through multiplexer circuitry (e.g., to allow those transistors to be shared between multiple coils), may include a pair of transistors or other inverter circuit associated with each coil, and/or may include other inverter circuit arrangements that allow alternating-current drive signals to be supplied to one or more selected coils 36.

During power transfer operations, transistors in the inverter circuitry are turned on and off based on control signals provided by control circuitry 42. In configurations in which multiple coils have multiple respective inverter circuits, the transistors in the active coils (coils selected for wireless power transfer) may be turned on and off without turning on and off the transistors in the inactive coils. In configurations in which multiplexing circuitry is used to couple the inverter circuitry to selected coils, the multiplexing circuitry is configured appropriately to route AC signals from the inverter circuitry to the selected coils. As the AC signals pass through one or more coils 36 that have been selected for supplying wireless power, alternating-current electromagnetic fields (wireless power signals 48) are produced that are received by corresponding coil(s) 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 converts received AC signals (received alternating-current currents and voltages associated with wireless power signals) from coil(s) 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with corresponding wireless communications circuitry 58 in control circuitry 42 of wireless power transmitting device 12 and/or other equipment, audio components, and other components (e.g., input-output devices 22 and/or control circuitry 20) and are used in charging an internal battery in device 10 such as battery 18.

Devices 12 and 10 include control circuitry 42 and 20. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using sensing circuitry to measure coil inductances and other parameters, processing measured inductance values, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil settings (e.g., which coils are active and weights for active coils) in a multi-coil array, and wireless power transmission levels, and performing other control functions. Control circuitry 42 and 20 may be configured to support wireless communications between devices 12 and 10 (e.g., control circuitry 20 may include wireless communications circuitry such as circuitry 56 and control circuitry 42 may include wireless communications circuitry such as circuitry 58). Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly over a wireless communications link established during operation of system 8. Devices 10 and 12 may, for example, have wireless transceiver circuitry in control circuitry 20 and 42 (see, e.g., wireless communications circuitry such as circuitry 56 and 58 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

Figure 2:
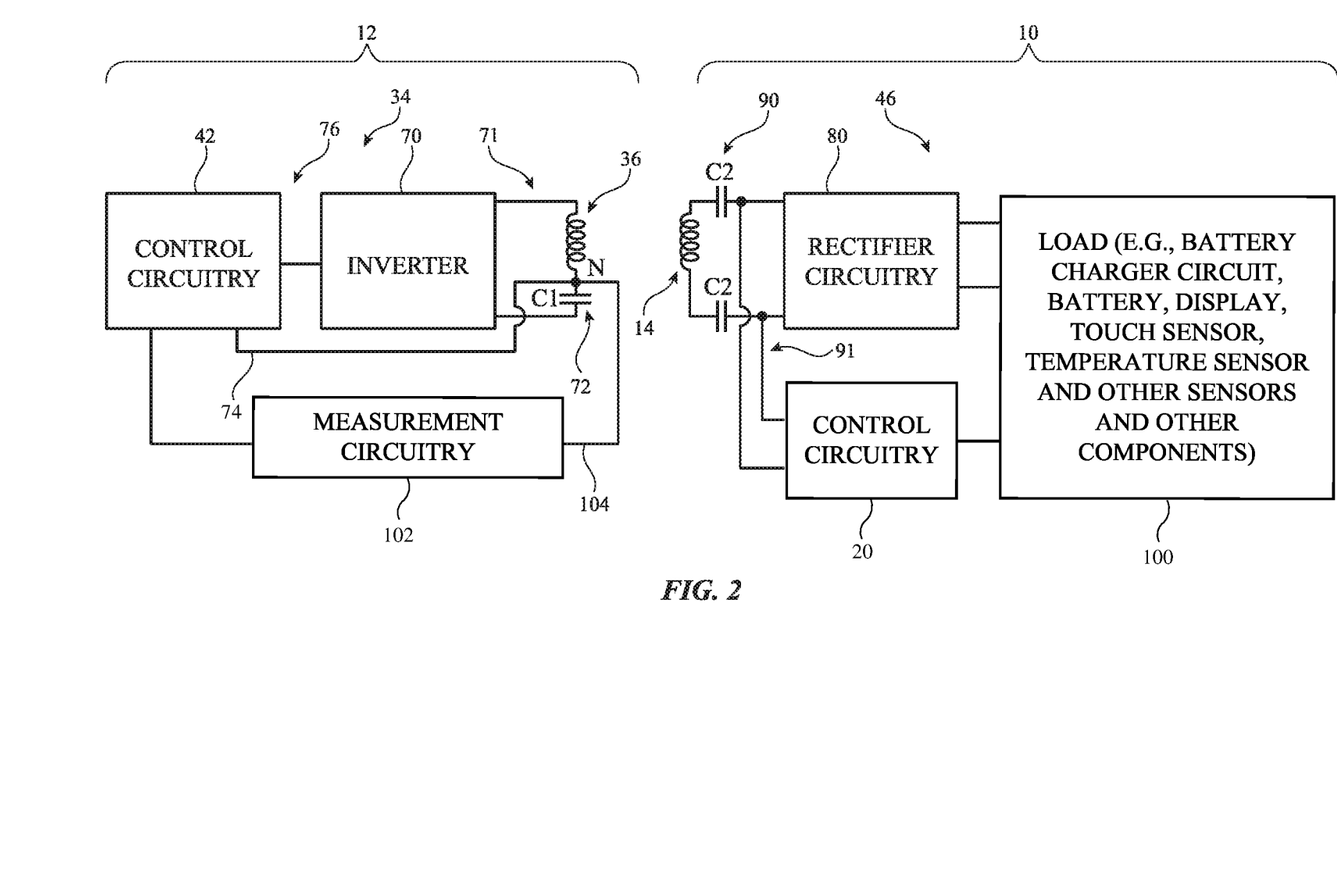
FIG. 2 is a circuit diagram of an illustrative wireless charging system in accordance with an embodiment.

A circuit diagram of illustrative circuitry for wireless power transfer (wireless power charging) system 8 is shown in FIG. 2. As shown in FIG. 2, wireless power transmitting circuitry 34 includes an inverter such as inverter 70 or other drive circuit that produces alternating-current drive signals such as variable-duty-cycle square waves or other drive signals for implementing a pulse width modulation (PWM) power modulation scheme, variable amplitude square waves or other drive signals for implementing an amplitude modulation (AM) power modulation scheme, or phase-shift modulated drive signals for implementing a phase shift power modulation scheme (as examples). These signals are driven through an output circuit such as output circuit 71 that includes coil(s) 36 and capacitor(s) 72 to produce wireless power signals that are transmitted wirelessly to device 10.

Coil(s) 36 are electromagnetically coupled with coil(s) 14. A single coil 36 and single corresponding coil 14 are shown in the example of FIG. 2. In general, device 12 may have any suitable number of coils (1-100, more than 5, more than 10, fewer than 40, fewer than 30, 5-25, etc.) and device 10 may have any suitable number of coils. Switching circuitry (sometimes referred to as multiplexer circuitry) that is controlled by control circuitry 42 can be located before and/or after each coil (e.g., before and/or after each coil 36 and/or before and/or after the other components of output circuit 71 in device 12 to couple the inverter of output circuit 71 to the array) and can be used to switch desired sets of one or more coils (e.g., coils 36 and output circuits 71 in device 12) into or out of use. For example, if it is determined that device 10 is located in a position that overlaps a particular coil 36 in device 12, then the particular coil 36 overlapping device 10 may be activated during wireless power transmission operations while other coils 36 (e.g., coils not overlapped by device 10 in this example) are turned off.

Control circuitry 42 and control circuitry 20 contain wireless transceiver circuits (e.g., circuits such as wireless communication circuitry 56 and 58 of FIG. 1) for supporting wireless data transmission between devices 12 and 10. In device 10, control circuitry 20 (e.g., communications circuitry 56) can use path 91 and coil 14 to transmit data to device 12. In device 12, paths such as path 74 may be used to supply incoming data signals that have been received from device 10 using coil 36 to demodulating (receiver) circuitry in communications circuitry 58 of control circuitry 42. If desired, path 74 may be used in transmitting wireless data to device 10 with coil 36 that is received by receiver circuitry in circuitry 56 of circuitry 20 using coil 14 and path 91. Configurations in which circuitry 56 of circuitry 20 and circuitry 58 of circuitry 42 have antennas that are separate from coils 36 and 14 may also be used for supporting unidirectional and/or bidirectional wireless communications between devices 12 and 10, if desired.

During wireless power transmission operations, transistors (switches) in inverter 70 are controlled using AC control signals from control circuitry 42. Control circuitry 42 uses control path 76 to supply control signals to the gates of the transistors in inverter 70. The duty cycle and/or other attributes of these control signals and therefore the corresponding characteristics of the drive signals applied by inverter 70 to coil 36 and the corresponding wireless power signals produced by coil 36 can be adjusted dynamically. Using switching circuitry, control circuitry 42 selects which coil or coils to supply with drive signals. Using duty cycle adjustments and/or other adjustments (e.g., drive frequency adjustments, amplitude adjustments, phase shift modulation scheme adjustments, etc.), control circuitry 42 can adjust the strength of the drive signals applied to each coil. A single selected coil may be used in transmitting power wirelessly from device 12 to device 10 or multiple coils 36 may be used in transmitting power. One or more devices 10 may receive wireless power and each of these devices may have one or more wireless power receiving coils that receive power from one or more corresponding wireless power transmitting coils.

Wireless power receiving device 10 has wireless power receiving circuitry 46. Circuitry 46 includes rectifier circuitry such as rectifier 80 (e.g., a synchronous rectifier controlled by signals from control circuitry 20) that converts received alternating-current signals from coil 14 (e.g., wireless power signals received by coil 14) into direct-current (DC) power signals for powering circuitry in device 10 such as load 100. Load circuitry such as load 100 may include battery 18, a power circuit such as a battery charging integrated circuit or other power management integrated circuit(s) that receives power from rectifier circuitry 80 and regulates the flow of this power to battery 18, and/or other input-output devices 22. Load circuitry 100 may contain a display, a touch sensor that overlaps the display, one or more touch sensors that are separate from the display, temperature sensors, accelerometers, pressure sensors, force sensors, compasses and gyroscopes, light-based proximity sensors and other proximity sensors, magnetic sensors, and/or other sensors, buttons, a keyboard, audio components such as speakers and microphones, integrated circuits for implementing control circuitry and communications circuitry (e.g., wireless communications circuitry), and/or other components. One or more capacitors C2 are used to couple coil 14 in input circuit 90 of device 10 to input terminals for rectifier circuitry 80. Rectifier circuitry 80 produces corresponding output power at output terminals that are coupled to load 100. If desired, load 100 may include sensor circuitry (e.g., current and voltage sensors) for monitoring the flow of power to load 100 from rectifier 80.

The properties (e.g., impedance) of each wireless power transmitting coil 36 in device 12 can be affected (e.g., increased) by the presence of overlapping coil(s) 14 and associated magnetic material (e.g., ferrite core material, etc.) in device 10. For example, the inductance L of one or more coils 36 can increase when device 10 is present in a position on the charging surface that overlaps those coils. The structures in device 10 such as metal housing walls and other metal structures, speakers, vibrators, and other components in device 10 that contain magnetic materials, and/or other electrical and structural components of device 10 can also affect measured coil inductance. The location(s) of coil(s) 14 and, in some configurations, the locations of other device structures (housing structures, components with magnetic materials, and other components) can therefore be determined by making inductance measurements or other signal measurements on each of coils 36 and processing these measurements (e.g., using interpolation techniques, etc.). This allows the location and orientation of device 10 on coils 36 to be determined. Based on information such as the location and orientation of device 10 and information on the locations of sensitive portions of device 10, one or more coils 36 may be selected in transmitting wireless power signals and the magnitude of the wireless power signals transmitted by each of these coils can be adjusted appropriately. For example, device 12 can select a given coil to use in transmitting wireless power signals that exhibits satisfactory coupling with the wireless receiving coil in device 10 while avoiding excessive exposure of the sensitive portions of device 10 to wireless power signals. The locations of the sensitive portions of device 10 may be measured by device 12 or may be determined by device 12 based on information on the location of the sensitive portions within device 10 and other information such as the location and orientation of device 10 on coils 36. A sensitive portion of device 10 may be a metal structure that is subject to heating when exposed to transmitted wireless power signals, may be associated with a sensitive component having magnetic materials that may influence the wireless power signals transmitted by device 12, and/or may be the positions of other electrical and/or structural components in device 10 for which it may be desired to limit exposure to wireless power signals (e.g., because the circuitry of a sensitive component may be sensitive to radio-frequency interference from the transmitted wireless power signals).

During wireless power transmission operations, transistors in inverter 70 are driven by AC control signals from control circuitry 42. Control circuitry 42 uses measurement circuitry 102 to make measurements on coils 36 (e.g., to monitor the charging surface of device 12 for the presence of objects such as device 10 and/or incompatible foreign objects). Measurement circuitry 102 may be coupled to node N in output circuit 71 using path 104. Measurement circuitry 102 includes oscillatory circuitry that applies alternating-current probe signals while measuring corresponding signals on node N (e.g., to measure coil impedance and/or changes in coil impedance as the probe signal frequency is maintained at one or more fixed frequencies and/or is swept between first and second frequencies). If desired, measurement circuitry 102 can include impulse response circuitry. For impulse response measurements, control circuitry 42 uses inverter 70 to apply square wave impulse pulses or other impulses to each coil 36 while using impulse response measurement circuitry in circuitry 102 to make measurements on output circuit 71 (e.g., measurements on the inductance L of coil 36, measurements of quality factor Q, which is associated with a resonating signal decay rate when a resonant circuit including coil 36 is stimulated with an impulse, etc.).

Each coil 36 in device 12 (e.g., a coil such as coil 36 of FIG. 2 that has been selected by control circuitry 42 using multiplexing circuitry in wireless transmitter circuitry 34) has an inductance L. One or more capacitors in output circuit 71 such as capacitor 72 exhibit a capacitance C1 that is coupled in series with inductance L in output circuit 71. When supplied with alternating-current drive signals from inverter 70, the output circuit formed from coil 36 and capacitor 72 will produce alternating-current electromagnetic fields that are received by coil(s) 14 in device 10. The inductance L of each coil 36 is influenced by magnetic coupling with external objects, so measurements of inductance L for each coil 36 in device 12 can reveal information on device(s) 10 on the charging surface of device 12.

During impulse response measurements, circuitry 42 uses impulse response measurement circuitry 102 (sometimes referred to as inductance measurement circuitry and/or Q factor measurement circuitry) to perform measurements of inductance L and quality factor Q. Impedance measurements and other measurements with circuitry 102 may be initiated in response to detection of an external object on device 12 using a foreign object detection sensor (e.g., a sensor using coils 36 and/or other coils, a sensor using light-based sensing, capacitive based sensing, or other sensing techniques, etc.). Impedance measurements and other measurements with circuitry 102 may also be initiated in response to manual input, based on wirelessly received commands, etc. During the measurements, control circuitry 42 directs inverter 70 to supply one or more excitation pulses (impulses) to each coil 36, so that the inductance L and capacitance C1 of the capacitor 72 in the output circuit 71 that includes that coil 36 form a resonant circuit. The impulses may be, for example, square wave pulses of 1 µs in duration. Longer or shorter pulses and/or pulses of other shapes may be applied, if desired. The resonant circuit resonates at a frequency near to the normal wireless charging frequency of coil 36 (e.g., about 120 kHz, 50-300 kHz, about 240 kHz, 100-500 kHz, or other suitable wireless charging frequency) or may resonate at other frequencies.

Figure 3:
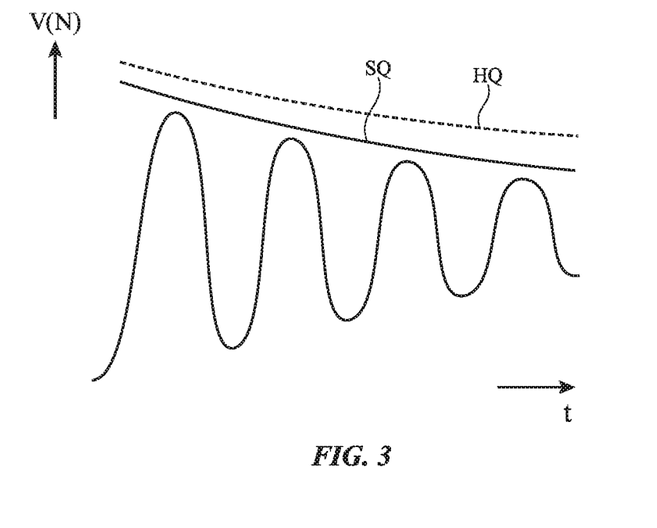
FIG. 3 is a graph of an illustrative impulse response to an applied impulse signal in a wireless charging system in accordance with an embodiment.

The impulse response (e.g., the voltage V(N) at node N of circuit 71) to the applied pulse(s) is as shown in FIG. 3. The frequency of the impulse response signal of FIG. 3 is proportional to $1/\sqrt{LC1}$, so L can be obtained from the known value of C1 and the measured frequency of the impulse response signal. Q may be derived from L and the measured decay of the impulse response signal. As shown in FIG. 3, if signal V(N) decays slowly, Q is high (e.g., HQ) and if signal V(N) decays more rapidly, Q is low (e.g., SQ). Measurement of the decay envelope of V(N) and frequency of V(N) of the impulse response signal of FIG. 3 with circuitry 102 will therefore allow control circuitry 42 to determine Q and L.

Figure 4:
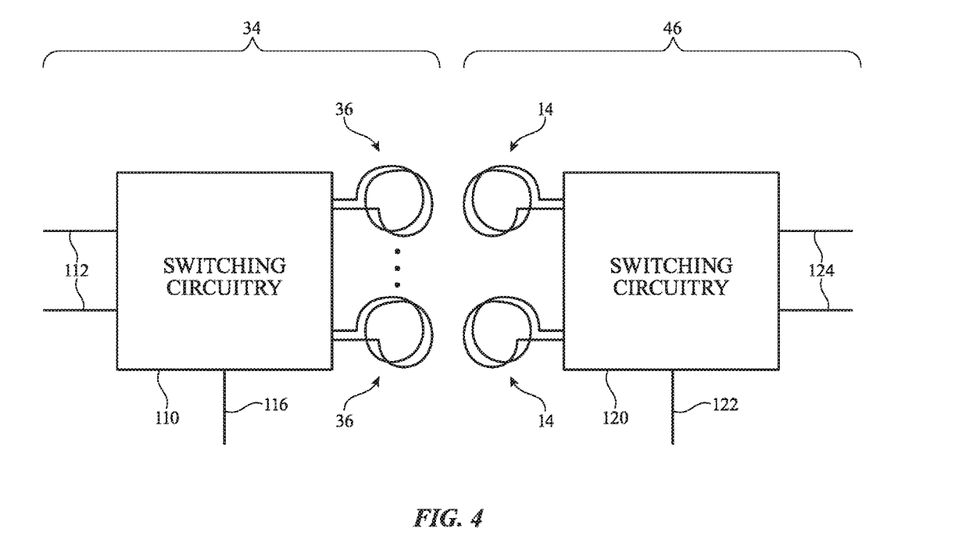
FIG. 4 is a diagram of illustrative wireless power transmitting and wireless power receiving circuitry in accordance with an embodiment.

FIG. 4 shows how wireless power transmitting circuitry 34 includes switching circuitry 110. Signals from inverter circuitry 70 are applied to switching circuitry 110 at input 112. Switching circuitry 110 forms part of wireless power transmitting circuitry 34 (sometimes referred to as inverter circuitry). Control signals applied to control input 116 by control circuitry 42 direct switching circuitry 110 to route the signals from input 112 to a selected one of coils 36 in an array of coils 36 in device 12. Wireless power receiving circuitry 46 of device 10 includes one or more coils 14. In configurations for device 10 that include multiple coils 14, coils 14 are coupled to switching circuitry 120. Control circuitry 20 applies control signals to control input 122 that direct switching circuitry 120 to route signals from a selected one of coils 14 to rectifier 80 via output terminals 124.

Figure 5:
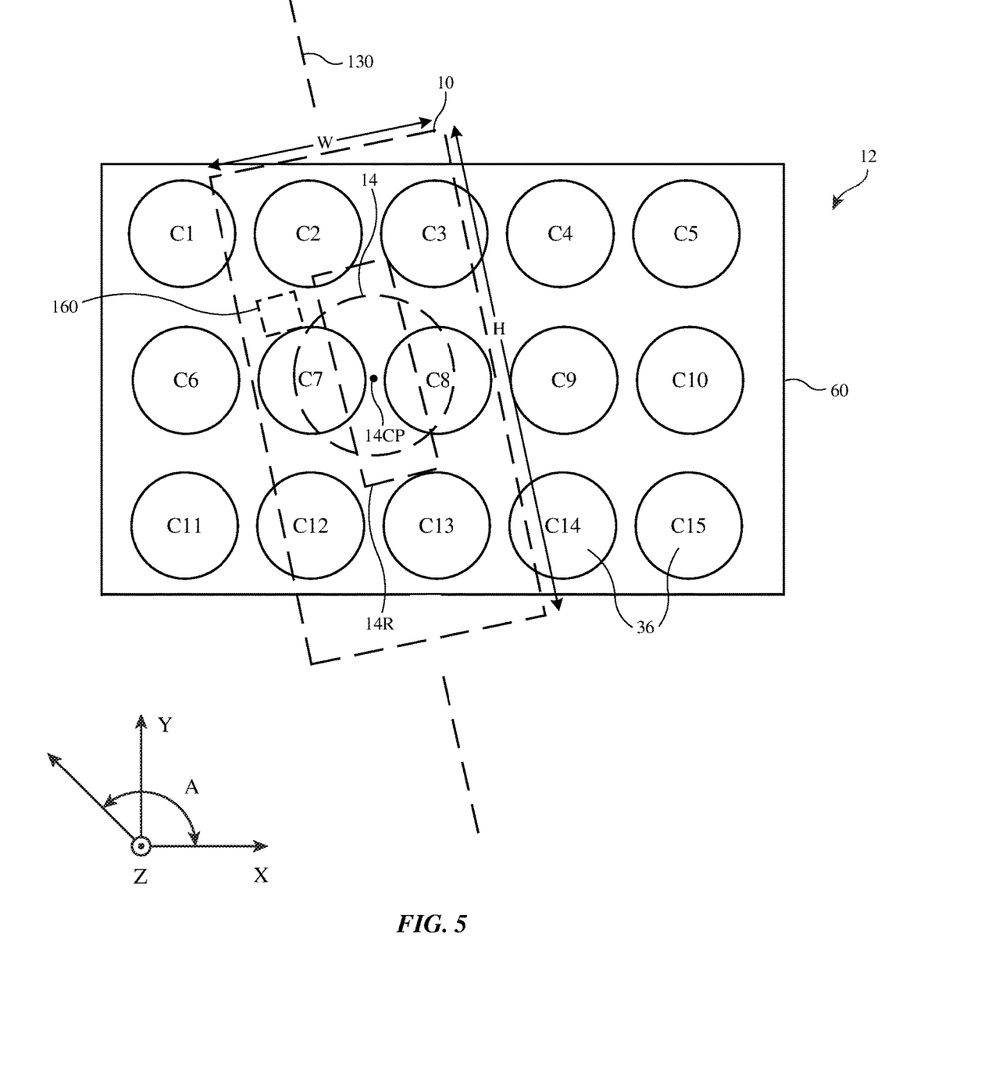
FIG. 5 is a top view of an illustrative wireless power transmitting device with an array of coils that forms a wireless charging surface in accordance with an embodiment.

With one illustrative configuration for wireless transmitting device 12, wireless transmitting device 12 is a wireless charging mat or other wireless power transmitting equipment that has an array of coils 36 that supply wireless power over a wireless charging surface that overlaps the array of coils. This type of arrangement is shown in FIG. 5. As shown in FIG. 5, device 12 has an array of coils 36 that lie in the X-Y plane. There are 15 coils C1 . . . C15 in the example of FIG. 5. Device 12 may have more coils 36 or fewer coils 36 if desired and, in some embodiments, coils C1 . . . C15 include overlapping coils.

Coils 36 of device 12 are covered by a planar dielectric structure such as a plastic member or other structure forming charging surface 60. The lateral dimensions (X and Y dimensions) of the array of coils 36 in device 36 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern, a pattern with square tiles, or other pattern.

The wireless power receiving coil of device 10 may have a circular shape (see, e.g., coil 14), a rectangular shape (see, e.g., coil 14R), or other suitable shape. When a user places device 10 on charging surface 60, coil 14 (or multiple coils 14 in configurations in which device 10 contains multiple coils) will overlap one or more coils 36. Control circuitry 42 uses impedance measurement circuitry such as impulse response measurement circuitry 102 and switching circuitry 110 to measure L for each of coils 36 under charging surface 60. If the measured value of L for a given coil matches the normal (nominal) L value expected for each of coils 36 in the array of coils 36 overlapping surface 60 (e.g., when the measured L value is not influenced by the presence of coil 14 or other portions of device 10), control circuitry 42 can conclude that device 10 is not present on the array of coils 36 in device 12. If a given measured value of L is larger than expected, control circuitry 42 can conclude that a portion of the housing of device 10 is present (e.g., if a decrease in L has been measured) or that coil 14 is present (e.g., if an increase in L has been measured). The locations and L values of each measured coil 36 can be analyzed by control circuitry 42 to help detect which type of device 10 is present (e.g., impedance-change patterns, which may sometimes be referred to as impedance images or impedance patterns, can be used to help identify different types of device and/or particular devices). Impedance patterns can also be analyzed by device 12 to determine the location of device 10 (e.g., the center of coil 14 and/or center of device 10) and to determine the angular orientation A of device 12. Using information on the location and orientation of device 10 and information on where a component that is sensitive to interference or heating from exposure to wireless power signals such as sensitive component 160 is located within device 10 and/or other information, device 12 selects a given coil for transmitting wireless power signals to device 10.

In the example of FIG. 5, coil 14 of device 10 is overlapping coils C7 and C8. Device 10 (e.g., the housing of device 10) in the example of FIG. 5 has a rectangular footprint (outline when viewed from above) and is characterized by longitudinal axis 130. Axis 130 is aligned at an angle A with respect to horizontal axis X in FIG. 5 (e.g., an angle of 0-360°). Knowledge of the location of the center of coil 14 and the value of angle A (the angular orientation of device 10 relative to device 12) can be used to adjust charging system parameters (e.g., to make transmitting coil selections, to adjust maximum transmit powers, and/or to adjust other system settings). For example, after a wireless link has been established between device 10 and device 12, device 10 can inform device 12 of the location of components that are potentially sensitive to exposure from wireless power signals relative to coil 14 and the outline of device 10 such as sensitive component 160 (e.g. radio-frequency-sensitive components that are sensitive to radio-frequency interference due to the wireless power signals or other sensitive components).

Device 12 can also use impedance measurements of coils 36 to detect the locations of sensitive components (e.g., by measuring where metal components are located, by measuring where magnetic material is located in device 10 that is not overlapped by coil 14, etc.). Control circuitry 42 in device 12 can also use impedance measurements on coils 36 to determine the position of device 10 (e.g., the location of coil 14 and the orientation of device 10 in the X-Y plane). Based on knowledge of the location of sensitive component 160 within device 10 and information on the location and orientation of device 12 and/or other suitable information, the location of sensitive component 160 relative to each of coils 36 can be determined. This information and information on the amount that each of coils 36 are overlapped by coil 14 (e.g., coupling information obtained from measured inductance values), control circuitry 42 can determine appropriate settings for transmitting wireless power to device 10 (e.g., a desired transmitting coil selection).

Consider, as an example, the scenario of FIG. 5 in which power receiving coil 14 overlaps power transmitting coils C7 and C8. Coil 14 overlaps coil C7 more than coil C8, so coil C7 has more electromagnetic coupling with coil 14 than coil C8 and is therefore to be preferred over coil C8 in transmitting wireless power signals to device 10 in the absence of other considerations. In the absence of sensitive components in device 10 such as sensitive component 160, device 12 could select coil C7 for transmitting wireless power to device 10 to maximize wireless power transfer efficiency. In device 10 of FIG. 5, however, sensitive component 160 is present and is located adjacent to coil C7 and relatively far from coil C8. Sensitive component 160 is partly overlapped by coil C7 and is therefore in a position where interference and/or heating from wireless power transmission signals from coil C7 are not desired. Even though coil C7 would normally be preferred over coil C8 in transmitting wireless power to device 10 because coil C7 is more coupled to coil 14 than coil C8, device 12 is aware of the location of sensitive component 160 and therefore can determine the amounts of overlap and coupling between coil C7 and sensitive component 160 and between coil C8 and sensitive component 160. Coil C7 is more coupled to sensitive component 160 than coil C8, so if the difference between the coupling of coils C7 and C8 to coils 14 is not too great (e.g., if satisfactory wireless power transfer performance can be obtained using either of these coils), device 12 can select coil C8 to use in wirelessly transmitting power to device 10 in order to minimize exposure of component 160 to wireless power signals from coil C7.

Device 12 may obtain information on the location of component 160 (sometimes referred to as sensitive component location information) from device 10 (e.g., device 10 may provide information such as lateral coordinates defining the position of component 160 relative to the position of coil 14 and/or the edges of device 10 or other reference structures such as speakers, that can be detected by the measurement circuitry of device 12). Device 12 may also obtain sensitive component location information (e.g., information on where component 160 is located within device 10) by identifying device 10 and retrieving appropriate sensitive component information for the identified device from a database maintained in device 12.

Device 12 may identify device 10 based on an inductance-based image of device 10 obtained from coil inductance measurements made with inductance measurement circuitry 102 or based on wirelessly transmitted information from device 10. Information on sensitive component locations within various power receiving devices may be maintained for each device 10 owned by a user, for each device 10 registered with device 12, for each known device or each commonly used device that is that is available to consumers, etc.

In some configurations, sensitive component 160 may be formed from one or more integrated circuits such as a wireless communications integrated circuit (e.g., a radio-frequency transceiver, baseband processor, or other communications circuitry), display driver circuitry, touch sensor circuitry, or other circuitry that is sensitive to signal interference when wireless power signals are transmitted by device 12.

Figure 6:
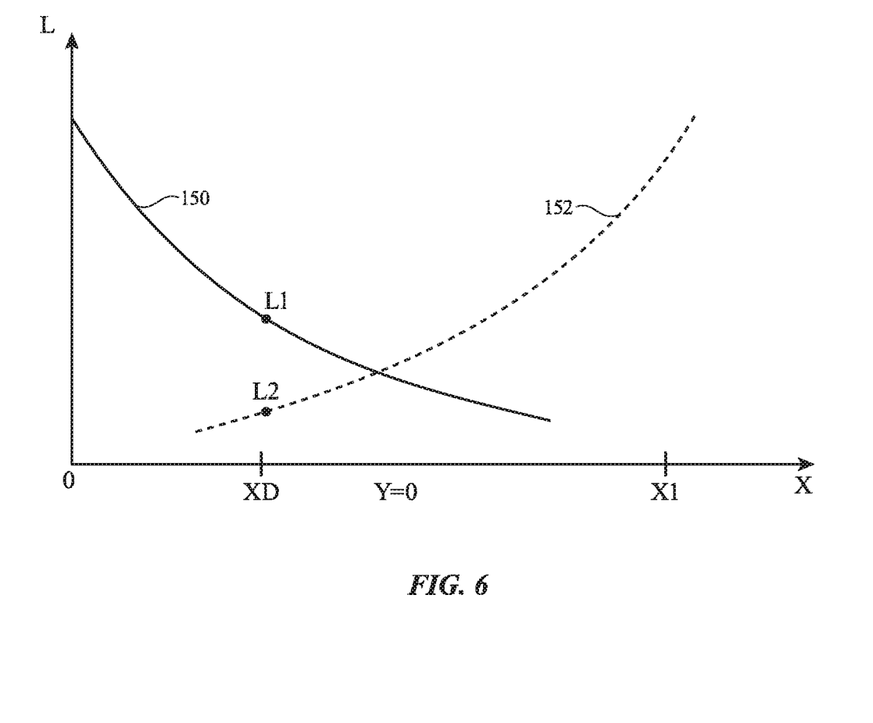
FIG. 6 is a graph showing illustrative inductances produced in first and second wireless power transmitting coils in a wireless power transmitting device as a function of wireless power receiving device coil location in accordance with an embodiment.

FIG. 6 is a graph showing how measured inductance L varies as a function of the position of coil 14 on charging surface 60. In the example of FIG. 6, a first of coils 36 (e.g., coil C7 of FIG. 5) is located at position (X,Y)=(0,0) and a second of coils 36 (e.g., coil C8 of FIG. 5) is located at position (X,Y)=(X1, 0). Curve 150 shows how the inductance of the first coil is highest when coil 14 is aligned with the first coil 36 and decreases as coil 14 is located at increasing distances X from the first coil. Curve 152 shows how the inductance of the second coil is highest when coil 14 is aligned with the second coil and decreases as coil 14 is located at increasing distances from the second coil (decreasing values of X). Curves 150 and 152 represent the non-linear relationships between L and receiver coil position relative to transmitter coil position. These non-linear relationships may be stored in device 12 using non-linear equations (e.g., non-linear expressions such as curve-fit nth-order polynomials where n is 2-7, more than 3, more than 2, less than 5, or other suitable value) and/or numerical look-up table entries. During non-linear interpolation operations, control circuitry 42 measures the inductance of the first and second coils and uses these inductance measurements to determine the locations of coil 14. In the example of FIG. 6, the measured inductance of the first coil (C7) is L1 and the measured inductance of the second coil (C8) is L2. Control circuitry 42 uses interpolation (e.g., expression-based non-linear interpolation or look-up-table-based non-linear interpolation) to determine coil position XD (e.g., the position of center 14CP of coil 14 of FIG. 5 relative to the first and second coils 36) from the measured values of L1 and L2.

In the FIG. 6 example, device 10 has a coil 14 that partly overlaps two coils 36. If desired, interpolation techniques may be used to determine the position of coil 14 (X,Y) on charging surface 60 from more than two coil inductance measurements. For example, the position of coil 14 can be determined by measuring the changes in inductance of three of coils 36 that are affected by the presence of coil 14, changes in inductance of four coils 36, changes in inductance of 5-20 coils 36, changes in inductance of more than 10 coils, fewer than 10 coils, 2-7 coils, etc.

Inductance measurements can be analyzed to determine the location and orientation of device 10 on charging surface 60. For example, inductance measurements can be made to determine the location and orientation (angular orientation A) of the housing for device 10, the location of the center of coil 14 and the location of asymmetrically located component(s) in device 10, the outline of a coil that is not rotationally symmetric, and/or other information on the position of device 10 on charging surface. Device 10 may, for example, have a housing formed from metal or other material that tends to lower the measured inductance for transmitting coils 36 that are overlapped by the housing. In scenarios in which the outline of device 10 is rectangular, the array of coils 36 under surface 60 may experience a corresponding rectangular set of inductance decreases. The outline of device 10 can be measured by using control circuitry 42 to recognize a rectangular pattern (inductance image) of lowered L values or other changed L values. By measuring the location of a rectangular set of reduced inductance values (e.g., a pattern of reduced coil inductances that have the shape of a known device 10), the location (X,Y position) and angular orientation (angle A of FIG. 5) of device 10 and therefore sensitive component 160 may be determined. Information on the location and angular orientation of device 10 and information on the position of component 160 within device 10 and/or other information can be used to determine where component 160 is located relative to each of coils 36 can be used by control circuitry 42 to adjust system parameters (e.g., to set maximum charging powers, to select a given coil for transmitting wireless power without producing undesired interference for component 160, etc.).

Figure 7:
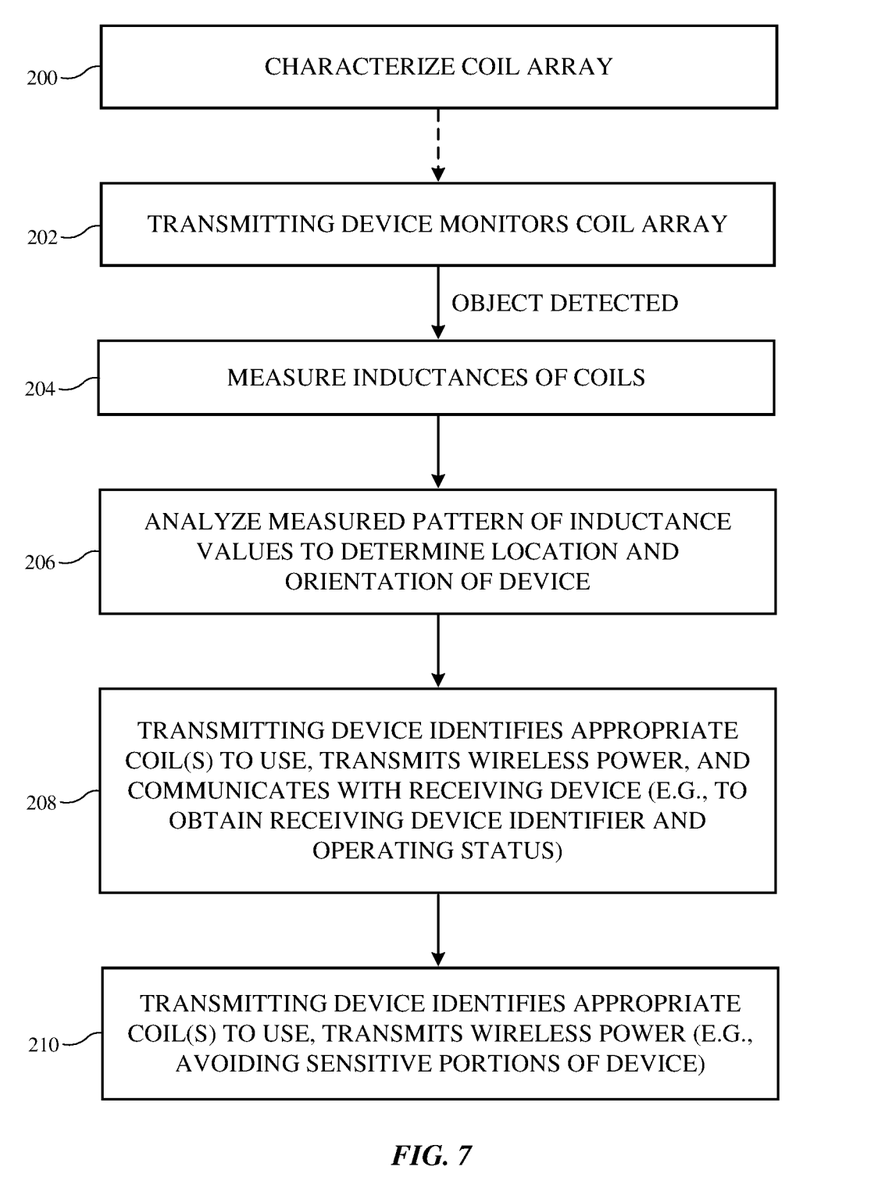
FIG. 7 is a flow chart of illustrative operations involved in operating a wireless power transmission system in accordance with an embodiment.

FIG. 7 is a flow chart of illustrative operations involved in using charging system 8. During the operations of block 200, the circuitry of device 12 and device 10 of system 8 may be characterized. During the characterization operations of block 200, the response of coils 36 to the presence of electronic device 10 can be measured. In particular, device 10 (or a representative test structure) can be placed at multiple different locations and can be oriented at multiple different angular orientations across the charging surface of device 12 while measurement circuitry such as circuitry 102 is used to measure the resulting patterns of inductances on coils 36. Device 10 can, as an example, be stepped across the surface of device 12 in 1 mm steps or larger or smaller steps and can be rotated by 1° angular rotations or larger or smaller angular orientations while the inductances of coils 36 are measured. Through this process, the inductance patterns on the coil array that are produced when device 10 is present can be obtained. In scenarios in which device 10 exhibits an asymmetrical impact on the inductance of underlying coils 36, the characterization information that is obtained can reveal whether device 10 is in a normal portrait orientation or is rotated by 180° relative to this normal orientation on charging surface 60.

During characterization operations, measurements from coils 36 and from the circuitry in device 10 can be used to identify the locations of sensitive components such as sensitive component 160 and can be used to determine the operating conditions at which the sensitive components are sensitive to wireless power transmission. For example, temperature measurements and other measurements can be performed while transmitting wireless power from each of coils 36 to determine which portions of device 10 are sensitive to induced temperature rises. The sensitivity of wireless communications devices, touch sensors, displays, and other sensitive electrical components to interference from transmitted wireless power signals can also be measured. In this way, a database of inductance patterns (inductance images) for each device 10 can be developed and corresponding sensitive component location information identifying where sensitive components such as component 160 are located within each device can be obtained. Characterization information for system 8 may be obtained for various devices 10 and this information stored in control circuitry 42 for future use by device 12 in recognizing devices 10. If desired, devices 12 and 10 can be characterized using test equipment. Test measurements from the test equipment can be used instead of using data gathered with device 12 and/or this data can be used in combination with data gathered using device 12.

Following characterization operations (e.g., during normal operations), device 12 uses monitoring circuitry to monitor for the presence of device 10 on charging surface 60 (block 202). For example, device 12 may use sensors that overlap coils 36 and/or measurement circuitry such as impulse-response measurement circuitry 102 that is coupled to coils 36 to monitor for device 10 (e.g., by making one or more measurements of impedance changes on coils 36, by measuring inductance changes to coils 36 with impulse response circuitry 102, etc.).

In response to detection of device 10, control circuitry 42 applies impulses (square wave pulses or other pulses) to output circuit 71 and an associated wireless power transmitting coil 36 in output circuit 71 using inverter 70 (block 204). This process is performed for each coil 36 in the array of wireless power transmitting coils in wireless charging surface 60 or for an appropriate subset of coils 36 (e.g., a subset of coils that were identified as being overlapped by device 10 during the operations of block 202). Switching circuitry 110 is adjusted by control circuitry 42 so that each coil 36 (or an appropriate subset of coils 36) is provided with a respective impulse from control circuitry 42. As each impulse is applied to the output circuit associated with a respective coil 36, control circuit 42 uses impulse response measurement circuit 102 to determine parameters such as coil inductance L, resonant frequency, Q-factor, etc. For example, control circuitry 42 can derive inductance L from a measurement of the resonant frequency of the signal measured at node N by circuitry 102 in response to an impulse applied to output circuit 71.

After measuring L and, if desired, other parameters associated with each output circuit 71 and coil 36 in charging surface 60 or in an appropriate subarea of charging surface 60, control circuitry 42 analyzes these measurements. For example, control circuitry 42 may use non-linear interpolation techniques during the operations of block 206 to identify the center of coil 14. Control circuitry 42 may also analyze the inductance measurements from coils 36 to determine the location and orientation of the outline (housing) of device 10. In some situations, these operations may be sufficient for control circuitry 42 to determine the location and orientation of device 10. If desired, control circuitry 42 may use pattern recognition techniques or other comparison techniques during the operations of block 206 to compare the pattern of measured inductances from coils 36 to the database of device inductance patterns obtained during characterization operations such as the operations of block 200. The pattern recognition operations of block 206 allow control circuitry 42 to determine the location and orientation of device 10 and may allow control circuitry 42 to identify device 10 (e.g., by device model, device type, etc.).

During the operations of block 208, control circuitry 42 determines which of coils 36 in the array of coils 36 on charging surface 60 is to be used in transmitting wireless power to device 10. Control circuitry 42 may, as an example, identify a given one of coils 36 that is overlapped by coil 14 and can transmit wireless power signals to coil 14 from that coil 36 using default wireless power transmission settings. If device 10 has battery power available and/or if device 10 receives sufficient wireless power from device 12, device 10 and device 12 can then establish a wireless communications link.

During the operations of block 210, device 12 identifies a given coil 36 to use in transmitting wireless power to device 10 to charge the battery in device 10 and/or to otherwise power device 10 while avoiding excessive exposure of sensitive components such as sensitive component 160 in device 10 to wireless power signals.

With one illustrative configuration, device 12 analyzes inductance measurements from coils 36 to directly measure the location of sensitive component 160. Device 12 may, as an example, determine that a particular area within the perimeter of device 10 has elevated amounts of metal present from the coil inductance measurements. During the operations of block 210, device 12 may select a wireless power transmitting coil 36 from the coil array that couples sufficient wireless power into coil 14 without exposing the area with the elevated amounts of metal to wireless power signals.

With another illustrative configuration, device 12 uses the wireless link that has been established with device 10 to obtain information from device 10 such as a device identifier, sensitive component location information, and/or other information on the characteristics of device 10. This information (e.g., information on the location of sensitive component 160 within device 10) is used by device 12 to select an appropriate coil 36 to supply wireless power to coil 14 without exposing sensitive component 160 to excessive wireless power. Device 12 may also obtain sensitive component location information and other information on the characteristics of device 10 by looking up this information in a database of device information maintained in control circuitry 42 (e.g., information from the characterization operations of block 200 and/or other device information). Control circuitry 42 can retrieve information from the database using the device identifier or other identifying information from device 10 that is obtained over the wireless communications link or by identifying device 10 from the pattern of measured inductances obtained during block 204 and using this information on the identity of device 10 to retrieve information on the location of sensitive component 60 from a database of device information maintained by control circuitry 42.

As described in connection with the example of FIG. 5, device 12 can weigh competing considerations in selecting which coil 36 to use in transmitting wireless power to device 12 such as the desire to enhance wireless coupling between the transmitting coil of device 12 and the wireless receiving coil of device 10 and the desire to avoid exposing sensitive component 160 to wireless power signals (e.g., by avoiding use of a wireless power transmitting coil that overlaps component 16. The resulting coil selection may, as an example, favor a coil such as coil C8 of FIG. 5 that overlaps coil 14 less than coil C7, but that helps minimize exposure of sensitive component 160 to wireless power signals transmitted by device 12 during battery charging operations.

The foregoing is illustrative and various modifications can be made to the described embodiments. The foregoing embodiments may be implemented individually or in any combination.

What is Claimed is:

1. A wireless power transmitting device having a charging surface configured to receive a wireless power receiving device, wherein the wireless power receiving device has a sensitive component that is sensitive to exposure to wireless power signals and that has a wireless power receiving coil configured to receive wireless power signals from the wireless power transmitting device while the sensitive component is at a location on the charging surface, the wireless power transmitting device comprising:
   an array of wireless power transmitting coils;
   inverter circuitry coupled to the array of wireless power transmitting coils, wherein the inverter circuitry is configured to supply drive signals to the array of wireless power transmitting coils to produce the wireless power signals;
   inductance measurement circuitry coupled to the array of wireless power transmitting coils; and
   control circuitry configured to:
      gather coil inductance measurements from the array of wireless power transmitting coils with the inductance measurement circuitry;
      determine the location of the sensitive component on the charging surface by analyzing the coil inductance measurements to identify an area in the wireless power receiving device that is sensitive to wireless power signal exposure; and
      select at least a given wireless power transmitting coil from among the array of wireless power transmitting coils to transmit the wireless power signals to the wireless power receiving coil based on the location of the sensitive component and based on coil inductance measurements.

2. The wireless power transmitting device defined in claim 1 wherein the control circuitry is configured to analyze the coil inductance measurements to determine a location and orientation of the wireless power receiving device on the charging surface.

3. The wireless power transmitting device defined in claim 2 wherein the control circuitry is configured to determine the location of the sensitive component on the charging surface using the location and orientation of the wireless power receiving device on the charging surface and using information on a location of the sensitive component within the wireless power receiving device.

4. The wireless power transmitting device defined in claim 3 further comprising storage, wherein the control circuitry is configured to determine the location of the sensitive component within the wireless power receiving device by retrieving information on the location of the sensitive component within the wireless power receiving device from the storage.

5. The wireless power transmitting device defined in claim 4 wherein the control circuitry is configured to retrieve the information on the location of the sensitive component within the wireless power receiving device based on information identifying the wireless power receiving device.

6. The wireless power transmitting device defined in claim 5 wherein the control circuitry is configured to produce the information identifying the wireless power receiving device by analyzing the coil inductance measurements.

7. The wireless power transmitting device defined in claim 5 wherein the control circuitry is configured to obtain the information identifying the wireless power receiving device from the wireless power receiving device over a wireless communications link.

8. The wireless power transmitting device defined in claim 1 wherein the inductance measurement circuitry comprises impulse response measurement circuitry.

9. The wireless power transmitting device defined in claim 8 wherein the control circuitry is configured to detect that the wireless power receiving device is present on the charging surface using the impulse response measurement circuitry.

10. The wireless power transmitting device defined in claim 9 wherein the control circuitry is configured to:
establish a wireless communications link with the wireless power receiving device in response to detecting that the wireless power receiving device is present on the charging surface; and
obtain information identifying where the sensitive component is located within the wireless power receiving device from the wireless power receiving device over the communications link.

11. A wireless power transmitting device having a charging surface configured to receive a wireless power receiving device, wherein the wireless power receiving device has a sensitive component that includes circuitry that is sensitive to radio-frequency interference when exposed to wireless power signals and that has a wireless power receiving coil configured to receive wireless power signals from the wireless power transmitting device while the sensitive component is at a location on the charging surface, the wireless power transmitting device comprising:
an array of wireless power transmitting coils;
inverter circuitry coupled to the array of wireless power transmitting coils, wherein the inverter circuitry is configured to supply drive signals to the array of wireless power transmitting coils to produce the wireless power signals that are received by the wireless power receiving device;
inductance measurement circuitry coupled to the array of wireless power transmitting coils; and
control circuitry configured to:
measure coil inductances for the wireless power transmitting coils using the inductance measurement circuitry; and
analyze the coil inductances to select a wireless power transmitting coil to transmit the wireless power signals to the wireless power receiving coil, wherein when the wireless power receiving coil overlaps a first of the wireless power transmitting coils by a first amount and overlaps a second of the wireless power transmitting coils by a second amount that is less than the first amount and when the first wireless power transmitting coil is coupled to the sensitive component more than the second wireless power transmitting coil, the second coil is the selected coil.

12. The wireless power transmitting device defined in claim 11 wherein the control circuitry is configured to select the wireless power transmitting coil to transmit the wireless power signals based at least partly on the location of the sensitive component on the charging surface.

13. The wireless power transmitting device defined in claim 12 wherein the control circuitry is configured to determine the location of the sensitive component on the charging surface by analyzing the coil inductances.

14. The wireless power transmitting device defined in claim 12 wherein the control circuitry is configured to determine the location of the sensitive component on the charging surface based at least partly on information received wirelessly from the wireless power receiving device over a wireless communications link.

15. The wireless power transmitting device defined in claim 11 wherein the control circuitry is configured to analyze the coil inductances to determine a location and orientation for the wireless power receiving device on the charging surface and is configured to use the location and orientation of the wireless power receiving device to select the wireless power transmitting coil.

16. The wireless power transmitting device defined in claim 15 wherein the control circuitry is configured to determine the location of the sensitive component on the charging surface using the location and orientation of the wireless power receiving device on the charging surface and using information on a location of the sensitive component within the wireless power receiving device.

17. A wireless power transmitting device configured to supply wireless power signals to a wireless power receiving device that contains a sensitive component that is sensitive to interference from the wireless power signals, comprising:
an array of wireless power transmitting coils overlapping a charging surface;
inverter circuitry coupled to the array of wireless power transmitting coils, wherein the inverter circuitry is configured to supply drive signals to the array of wireless power transmitting coils to produce the wireless power signals;
impulse response measurement circuitry coupled to the array of wireless power transmitting coils; and
control circuitry configured to:
measure coil inductances for the wireless power transmitting coils using the impulse response measurement circuitry;
determine a location and orientation of the wireless power receiving device on the charging surface from the measured coil inductances; and identify a given one of the wireless power transmitting coils to use to transmit the wireless power signals without interfering with the sensitive component based on the location and orientation of the wireless power receiving device.

18. The wireless power transmitting device defined in claim 17 wherein the control circuitry is configured to:
   determine a location at which the sensitive component overlaps the charging surface by analyzing the measured coil inductances; and
   identify the given one of the wireless power transmitting coils to transmit the wireless power signals based at least partly on the location at which the sensitive component overlaps the charging surface.

19. The wireless power transmitting device defined in claim 17 wherein the control circuitry is configured to:
   determine a location at which the sensitive component overlaps the charging surface based on the location and orientation of the wireless power receiving device; and
   identify the given one of the wireless power transmitting coils to use in transmitting the wireless power signals based at least partly on the location at which the sensitive component overlaps the charging surface.

* * * * *